United States Patent Office 3,597,334
Patented Aug. 3, 1971

3,597,334
ELECTROPLATED VINYL CHLORIDE GRAFT COPOLYMER
Gunther Bernhardt, Hangelar, Robert Buning, Ilse-Ursula Nebel, and Egon Bierwirth, Oberlar, and Werner Trautvetter, Spich, Germany, assignors to Dynamit Nobel AG, Troisdorf, Bezirk Cologne, Germany
No Drawing. Continuation-in-part of application Ser. No. 754,454, Aug. 21, 1968. This application Oct. 3, 1968, Ser. No. 764,971
Int. Cl. C23b 5/60
U.S. Cl. 204—20
5 Claims

ABSTRACT OF THE DISCLOSURE

An electroplated product conprising a graft copolymer of vinyl chloride on a conjugated diene backbone. The copolymer is first sensitized with stannous chloride, then chemically plated with metal and then electroplated.

---

This is a continuation in part of application Ser. No. 754,454, filed Aug. 21, 1968, and abandoned concurrently with the filing of this amendment.

This invention relates to novel metallized shaped articles. It more particularly refers to such articles which are thermoplastics.

It is known that homopolymers of vinyl chloride cannot be metallized by electroplating methods to produce a genuine bond between the metal and the plastic. The adhesion strengths of metal films applied to vinyl chloride polymers by methods of the prior art are less than 0.2 kg. per 25 mm. of width according to DIN 40802. For practical purposes, however, such adhesion strengths must be greater than 1.0 kg. per 25 mm. of width in order to have commercially useful metallized articles.

It is further more known that objects made from acrylonitrile-butadiene-styrene, ABS, polymers can be metallized by electroplating to produce a genuine metal-to-plastic bond which is sufficient for commercial purposes. Attempts have been made to metallize objects made from molding compounds prepared from mixtures of ABS polymers with various types of polyvinyl chloride, PVC. In the case of an ABS content of over 50% by weight, the adhesion strengths are around 1.0 kg. per 25 mm. of width. This shows that the addition of PVC to ABS polymers results in a substantial loss of strength of adhesion, and that the addition of ABS polymers to PVC results in no great improvement in the poor adhesion of the metal film to PVC.

It is therefore an object of this invention to provide a novel metallized shaped article.

It is another object of this invention to provide a novel metallizable substrate containing vinyl chloride values.

Other and additional objects of this invention will become apparent from a consideration of this entire specification including the claims hereof.

In accord with and fulfilling these objects, one aspect of this invention resides in a novel substrate for metallization. This substrate is a graft copolymer of vinyl chloride onto a diene polymer. It is also within the scope of this invention to graft other ethylenically unsaturated monomers onto the diene polymer. Diene polymers according to this invention include co- and ter- or higher member polymers. They also include mixtures of diene polymers with other, computable polymers.

It has now surprisingly been found that considerably improved strengths of adhesion of metal films to thermoplastic shaped articles containing polyvinyl chloride are achieved if the metallization is of shaped objects made from thermoplastics comprising polymers that have been prepared by the grafting of vinyl chloride, with the addition, if desired, of other ethylenically unsaturated monomers that can be copolymerized with vinyl chloride, onto polymers of dienes. The adhesion strengths achieved are especially high when the graft polymer contains 80 to 95% copolymerized vinyl chloride. Good properties are achieved when the vinyl chloride content of the graft polymer amounts to more than 50% by weight.

Polymers of dienes are used as the basis for the grafting. Suitable dienes from which such polymers can be made are, for example, butadiene, chloroprene, isoprene, etc. Polymers of dienes that are suitable for the grafting include natural rubber (in the form of latex, for example), butadiene polymers, chlorobutadiene polymers, and copolymers thereof, such as those containing styrene. The percentage of the comonomer is not critical. It can amount to about 0.1 to 40%, by weight, and preferably 5 to 20%, of the polymer to be grafted. The molecular weights of the diene polymers to be grafted can be varied within a wide range. For example, diene polymers having low molecular weights ranging from about 1,000 to 5,000, can be used as the basis for grafting. These polymers can be produced with Ziegler catalysts, for example.

The graft polymerization can be performed in a known manner in emulsion, suspension, solution, or melt at a temperature in the range from −60 to −80° C., by means of radical formers, with the addition of regulators if desired.

Suitable ethylenically unsaturated monomers that can be copolymerized with vinyl chloride are, for example, vinyl esters such as vinyl acetate, vinyl propionate, and the like, esters of unsaturated acids such as acrylic acid esters and methacrylic acid esters, as for example methyl acrylate, ethyl acrylate, 2-ethylhexyl acrylate, n-octyl acrylate, methyl methacrylate, ethyl methacrylate, and the like, and vinylidene chloride as well as related compounds.

By varying the composition of the starting diene polymer and by varying the vinyl chloride or comonomer content of the graft copolymer, the physical properties of the shaped objects to be metallized can be widely varied to suit any given particular application.

When objects are used which are made from polymers prepared by the grafting of vinyl chloride onto polymers of dienes, with the addition, if desired, of ethylenically unsaturated monomers that can be copolymerized with vinyl chloride, it is surprising to find that adhesion strengths are obtained in the metallization, which far exceed minimum commercial requirements. For the achievement of higher adhesion strengths, the proportion of the diene polymer in the vinyl graft polymer can be relatively small. The coatings produced have a high surface brilliance and high surface hardness.

Shaped objects can be formed from the graft polymers by known methods. The stabilizers customarily used with PVC can be added to the molding compounds prior to use.

The metallization can be performed in a known manner by the following procedure, which can be modified according to the particular shaped object:

(1) Degreasing: e.g., with 40% NaOH.
(2) Etching: e.g., with chromosulfuric acid (40 g. $K_2Cr_2O_7$+20 g. $H_2O$+500 ml. concentrated sulfuric acid). Etching temperatures: 20° C. to 70° C., etching time ranging from 15 to 90 minutes.
(3) Neutralizing: e.g., with 20% ($H_2O$)$NaHSO_3$ solution.
(4) Sensitizing: e.g., with stannous chloride solution (35 g. $SnCl_2$+50 cc. conc. HCl+1000 cc. $H_2O$).
(5) Activating: e.g., with silver nitrate solution (2 g. $AgNO_3$ in 50 cc. $H_2O$+10 cc. conc. $NH_4OH$, water added to make 1000 cc.).

(6) Chemical production of the ground coat: e.g., immersing the plastic in a solution prepared from solution A and solution B in a 1:1 ratio:

SOLUTION A

| | G. |
|---|---|
| Copper sulfate | 31.8 |
| Nickel chloride | 8.2 |
| 37% aqueous solution of formaldehyde | 76.6 |
| Water, 532 cc. | |

SOLUTION B

| | |
|---|---|
| Sodium hydroxide | 23.9 |
| Potassium sodium tartrate | 95.5 |
| $Na_2CO_3$ | 8.2 |
| Water, 532 cc. | |

Other ground coats, such a nickel or silver ground coats can be produced chemically by a similar procedure.

(7) The ground coat was then galvanically built up with copper in a known manner. The copper film had a thickness of 40–50μ before measurement of the strength of adhesion. Nickel, chromium, silver and gold films can also be produced.

The advantages of the process of the invention are shown by the following examples:

EXAMPLES 1A–D AND 2A–I

Two types of polymers were compared with one another. Series 1 is a polyvinyl chloride-ABS mixture, while seires 2 shows the use of the graft polymer according to the invention.

EXAMPLES 1A–D

A vinyl chloride copolymer having a K value of 60 was compounded with varying amounts of an ABS polymer. The ABS polymer was Cycolac EP 3510 of the Marbon Chemical Division. 2% by weight of a tin stabilizer was added to the compounds, which is commercially obtainable under the name Advastab M 17

$$[n—C_4H_9)_2Sn(Sn—CH_2—COO—C_8H_{17})2]$$

Sheets 4 mm. thick were pressed and metallized in the manner described. Then the adhesion strength of the metal films obtained was measured according to DIN 40802. The values obtained are shown in the following Table 1.

TABLE 1

| | Weight percent | | Strength of adhesion (per DIN 40802) in kg./25 mm. of width |
|---|---|---|---|
| | PVC | ABS | |
| Example: | | | |
| 1a | 90 | 10 | <0.2 |
| 1b | 80 | 20 | <0.2 |
| 1c | 70 | 30 | <0.2 |
| 1d | 50 | 50 | 0.8 |

EXAMPLES 2A–I

Three different types of diene polymers in emulsion form were used for the grafting.

Type 1: Copolymer of butadiene and styrene with a styrene content of 20% by weight.
Type 2: Natural rubber (so-called centrifuge latex).
Type 3: Poly-2-chlorobutadiene.

The graft polymerization was performed in a known manner in emulsion with water-soluble peroxides. Instead of emulsion polymerization, the block or suspension polymerization methods can also be used. The polymerization temperature amounted in the present case to 55° C. The polymerization was discontinued as soon as the stated vinyl chloride content was achieved in the graft polymer. The graft polymers obtained were mixed with 2% by weight of a tin stabilizer that is commercially obtainable under the name Advastab M 17

$$((n-C_4H_9)_2Sn(S—CH_2—COO—C_8H_{17})_2)$$

and then pressed into sheet 4 mm. thick where were used for metallization in the manner described. Then the strength of adhesion of the metal films obtained was determined according to DIN 40802. The values obtained are shown in Table 2.

TABLE 2

| Material | | Wt. percent of VC in the graft polymer | Adhesion strength (per DIN 40802), kg./25 mm. width |
|---|---|---|---|
| Example: | | | |
| 2a | Type 1 | 95 | 2.6 |
| 2b | do | 90 | 4.8 |
| 2c | do | 85 | 5.6 |
| 2d | Type 2 | 95 | 2.1 |
| 2e | do | 90 | 4.2 |
| 2f | do | 85 | 5.1 |
| 2g | Type 3 | 95 | 1.9 |
| 2h | do | 90 | 4.5 |
| 2i | do | 85 | 5.7 |

The strengths of adherence of the metal films to the surfaces of the shaped plastic articles as illustrated in the examples was observed to exist independent of whether the base layer comprises nickel or copper and the electrolytically produced plating layer of approximately 40 micron thickness comprised copper, nickel or chromium.

What is claimed is:

1. A chemogalvanically metal coated shaped article comprising a thermoplastic substrate bearing a ground coat of copper, silver or nickel and a second layer copper, silver, gold, nickel or chromium, said second layer being an electroplate and being in direct adhering contact with said ground coat, said shaped article having a metal-to-plastic bond strength of greater than 1 kg. per 25 mm. of width and wherein said thermoplastic substrate is a graft copolymer with the grafting monomer comprising vinyl chloride and the polymeric backbone comprising a conjugated diene polymer said graft copolymer containing more than 50 weight percent vinyl chloride units.

2. A shaped article as claimed in claim 1 wherein said grafting monomer comprises vinyl chloride admixed with at least one other ethylenically unsaturated monomer copolymerizable with said vinyl chloride.

3. A shaped article as claimed in claim 1 wherein said diene polymer is a copolymer.

4. A shaped article as claimed in claim 1 wherein said diene is at least one conjugated diene selected from the group consisting of butadiene, isoprene, chloroprene and rubber.

5. A shaped article as claimed in claim 1 containing about 80 to 95 weight vinyl chloride in said graft copolymer.

References Cited

UNITED STATES PATENTS

| | | | |
|---|---|---|---|
| 2,211,582 | 8/1940 | Ruben | 204—22 |
| 3,012,000 | 12/1961 | Aries | 260—879 |
| 3,223,655 | 12/1965 | Murdock | 260—879 |
| 3,267,007 | 8/1966 | Sloan | 204—22 |
| 3,281,345 | 10/1966 | Kühne | 204—163 |
| 3,445,350 | 5/1969 | Klinger et al. | 204—20 |

JOHN T. GOOLKASIAN, Primary Examiner

W. E. HOAG, Assistant Examiner

U.S. Cl. X.R.

29—195, 161; 204—22, 30; 260—879